Aug. 17, 1937.  J. C. CURTIS  2,090,031
ROCK DRILL
Filed June 9, 1936
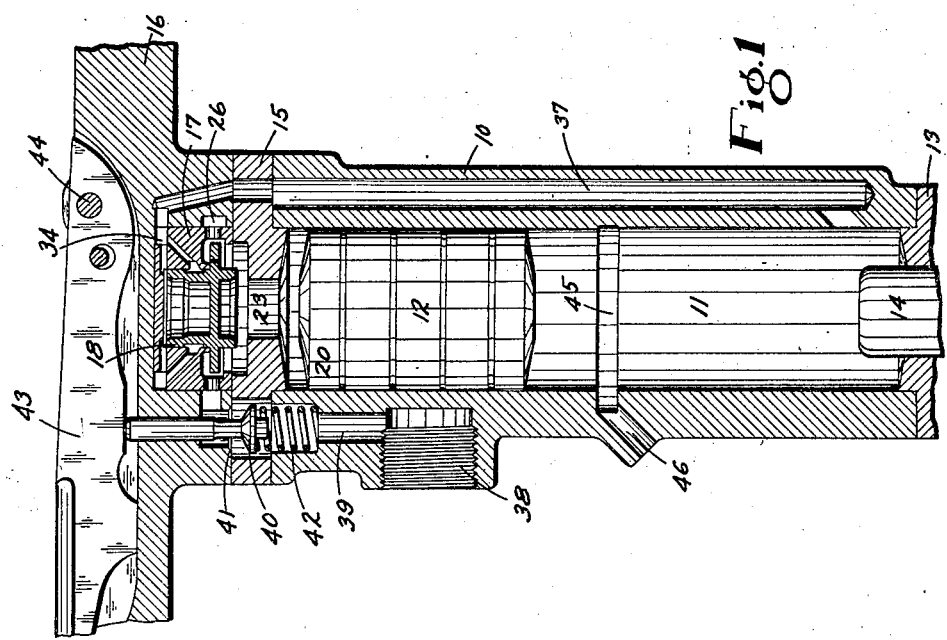
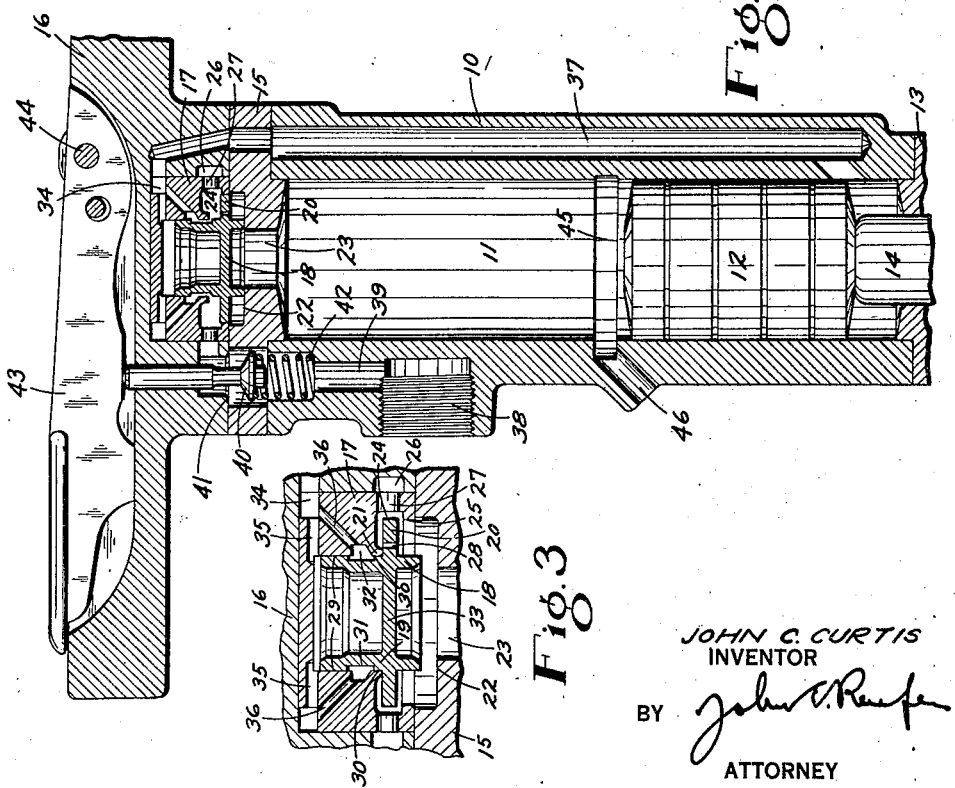
JOHN C. CURTIS
INVENTOR
BY *John T. Renfer*
ATTORNEY Patented Aug. 17, 1937

2,090,031

UNITED STATES PATENT OFFICE 2,090,031

ROCK DRILL

John C. Curtis, Garfield Heights, Ohio, assignor to The Cleveland Rock Drill Company, Cleveland, Ohio, a corporation of Ohio Application June 9, 1936, Serial No. 84,329

3 Claims. (Cl. 121—19)

This invention relates broadly to rock drills, but more particularly to a distributing valve for rock drills of the hammer type.

One object of this invention is to provide a rock drill with a relatively light valve which is readily responsive to the action of the motive fluid.

Another object of this invention is to provide a fluid actuated rock drill with a simple valve capable of rapid and positive action for efficiently controlling the distribution of the motive fluid.

Other objects of this invention will be apparent from the following detailed description wherein similar characters of references designate corresponding parts and wherein:

Fig. 1 is an elevational sectional view of a rock drill illustrating the invention.

Fig. 2 is a view similar to Fig. 1 illustrating parts in different positions.

Fig. 3 is an enlarged sectional view of the valve positioned as shown in Fig. 1.

Referring to the drawing, 10 represents the cylinder of a rock drill having a cylindrical piston chamber 11 within which is reciprocably mounted a piston 12. The front end of the piston chamber 11 is closed by a spacer 13 having a tappet 14 slidable therein and adapted to receive the blows of the piston 12, which blows are transmitted to a tool implement (not shown) mounted within the front end of the machine.

Secured to the rear end of the cylinder 10, there is a plate 15 clamped in place by a handle 16 which is bolted to the cylinder in the usual manner. Within this handle is disposed coaxially with the piston chamber 11 a valve block 17 formed with a valve chamber having a valve 18 reciprocable therein. This valve comprises a stem 19 having an annular flange 20 formed thereon intermediate its ends. The flange is capable of abutting engagement with an annular seat 21 for limiting the upward movement of the valve, while its downward movement is checked by the front end of the stem 19 engaging the bottom of a counterbore 22 formed in the plate 15 and communicating with the rear end of the piston chamber 11 through a port 23.

When the valve 18 is located in its uppermost position, the flange 20 is located within an enlarged annular recess or inlet chamber 24 which communicates with the counterbore 22 through a straight bore 25 of a diameter substantially equal to that of the flange 20. The inlet chamber 24 is in constant communication with an annular groove 26 through radial ports 27. Through the flange 20, there is also provided a relatively small port 28, the purpose of which will be explained later.

Above the flange 20, the stem 19 is reciprocably mounted within a flat bottom bore 29 formed in the valve block 17. Immediately above the flange 20, the stem 19 has a cylindrical portion 30 capable of fluid tight engagement with the inner wall of the bore 29, which portion is terminated by an external annular recess 31. This last recess is in communication with a similar recess 32 formed within the block 17. To lighten the valve the stem 19 is partly bored from both ends to form a relatively thin internal wall 33, while the ends of the stem or valve constitute annular surfaces of substantially equal area.

The upper end of the block 17 is reduced in diameter to form an annular recess 34 with which the bottom of the bore 29 is in communication through radial ports 35, while the recess 32 is also in communication with the recess 34 through ports 36. Leading from the recess 34 to the front end of the piston chamber 11, there is a plurality of ports 37.

Formed within the side wall of the cylinder 10, there is a threaded bore 38 which is capable of communication with the annular recess 26 through a port 39. Within this last bore is operatively mounted a throttle valve 40 constantly urged against its seat 41 by a compression spring 42. The throttle valve extends into the handle 16 where it engages a throttle lever 43 by which it may be shifted and maintained in open position, the throttle lever being pivotally secured within the handle 16 by a cross pin 44.

Intermediate its ends, the piston chamber 11 is provided with an annular groove 45 which opens to the atmosphere through an exhaust port 46.

In the operation of the machine, if the parts are presumed to be positioned as shown in Fig. 1, the motive fluid admitted into the threaded bore 38 will flow into the annular recess 26 through the port 39, which port is opened by the throttle valve 40 maintained away from its valve seat 41 by the throttle valve lever 43 held in a downward position. From the annular recess 26, the motive fluid will flow into the annular recess 24 through the ports 27 where it will act on the forward end of the valve for maintaining the valve in the position shown in Fig. 1. In this position of the valve, the motive fluid is free to flow into the rear end of the piston chamber 11 via the bore 25, counterbore 22 and inlet port 23. The piston 12 reaching the rear end of its stroke will be subjected to the action of the motive fluid admitted through the port 23, and driven thereby forwardly to deliver its blow to the tappet 14.

During the forward travel of the piston, the latter will cover the exhaust groove 45, and thereafter will compress the fluid remaining into the front end of the piston chamber 11. This compressed fluid will be forced back through the ports 37 into the valve block bore 29 via the recess 34 and ports 35, where it will act on the end of the valve stem 19 and the upper side of the valve inner wall 33 for tending to shift the valve forwardly. When the piston reaches the end of its forward stroke, it will uncover the exhaust groove 45, thus allowing the fluid admitted into the rear end of the piston chamber 11 to exhaust to the atmosphere through the exhaust port 46, and causing thereby a drop of the motive fluid pressure acting on the forward end of the valve. This drop of pressure together with the action of the compressed fluid on the rear end of the valve and inner surface 33 will cause the forward shifting of the valve into the position shown in Fig. 2.

During the forward shifting of the valve, the peripheral wall of the flange 20 will engage the inner wall of the bore 25 prior to the disengagement of the valve stem cylindrical portion 30 with the inner wall of the bore 29, thus momentarily cutting off the supply of the motive fluid to the piston chamber 11. In this manner, the motive fluid is prevented from being concurrently admitted on both sides of the piston 12 immediately after the valve flange 20 moves away from its valve seat 21, increasing thereby the efficiency of the machine.

When the valve 18 is positioned as shown in Fig. 2, the bottom of the counterbore 22 acts as a seat for the forward end of the valve stem. In this position of the valve, the motive fluid from the rearward side of the flange 20 will slowly be admitted to the forward side thereof through the port 28 in a manner calculated to overcome the action of the motive fluid on the rearward side of the flange when the valve is shifted upwardly. From the annular recess 24, the motive fluid will flow into the annular recess 34 via the valve stem groove 31, annular recess 32 and passage 36. From the recess 34, it will be admitted into the rear end of the bore 29 to act on the upper end of the valve stem 19 and the upper side of the inner valve wall 33 for holding the valve in its forward position. The motive fluid from the annular recess 34 will also be admitted into the forward end of the piston chamber 11 through the ports 37 to act on the piston for driving it rearwardly.

During its rearward movement, the piston will cover the exhaust groove 45, and thereafter will compress the fluid remaining within the rear end of the piston chamber 11, which will be admitted on the lower side of the valve inner wall 33 through the port 23, tending thereby to shift the valve rearwardly. Subsequently, the piston 12 will uncover the exhaust groove 45, allowing the motive fluid admitted into the front end of the piston chamber 11 to escape to the atmosphere through the exhaust port 46. The motive fluid previously acting on the end of the upper end of the valve stem 27 and the upper side of the valve inner wall 33 will also exhaust through the ports 37, thus causing a drop of pressure within the end of the bore 29. This drop of pressure together with the action of the compressed fluid on the lower side of the valve inner wall 33 will cause the rearward shifting of the valve.

During the shifting of the valve in a rearward direction, the cylindrical portion 30 of the valve stem 19 will engage the inner wall of the bore 29 prior to the disengagement of the peripheral wall of the flange 20 with the inner wall of the bore 25, thus again momentarily cutting off the supply of the motive fluid to the piston chamber 11, and thereby increasing the efficiency of the machine as explained previously in connection with the forward movement of the valve.

From the foregoing, it will be seen that the valve is characterized by the fact that in one direction it is seated on the end and in the other it is seated on the flange, affording thereby a simple and efficient construction. The valve is further characterized by the fact that the motive fluid is momentarily cut off during the shifting of the valve, a feature which also increases the efficiency of the machine.

I claim:

1. In a rock drill, a cylinder having a piston chamber, a fluid actuated piston reciprocable within said chamber, a valve chamber having a motive fluid inlet controlling valve reciprocable therein, passages leading from said valve chamber to both ends of said piston chamber, said valve including a stem having a flange formed thereon intermediate its ends, valve seats within said valve chamber engageable with one end of said stem and one side of said flange for limiting the travel of the valve, said valve while engaging either of said valve seats allowing the flow of the motive fluid through said passages into one or the other end of said piston chamber for actuating said piston, and bearing surfaces within said valve chamber engageable with the peripheral wall of said valve stem and flange for momentarily cutting off the supply of the motive fluid to said piston chamber during the reciprocation of said valve.

2. In a rock drill, a cylinder having a fluid actuated piston reciprocable therein, a valve block formed with a supply chamber having motive fluid admitted therein, passages leading from said chamber to both ends of said cylinder, a valve reciprocable within said valve block for controlling the inlet flow of the motive fluid through said passages, said valve including a stem and a flange, a duality of opposed areas within said stem, said valve being actuated due to compressed fluid from one end of the cylinder admitted on one of said areas while the other is subjected to a drop of the motive fluid pressure caused by the motive fluid exhausting from the other end of the cylinder, said valve while at either end of its travel allowing the flow of the motive fluid through said passages into one or the other end of said cylinder, means for admitting motive fluid on the valve area last subjected to the compressed fluid from the cylinder for momentarily holding the valve at the ends of its travel, and means including bearing surfaces within said valve block engageable with said valve stem and flange for momentarily cutting off the supply of the motive fluid to said cylinder during the reciprocation of the valve.

3. In a rock drill, a cylinder having a fluid actuated piston reciprocable therein, a valve block formed with a supply chamber having motive fluid admitted therein, passages leading from said chamber to both ends of said cylinder, a valve reciprocable within said valve block for controlling the inlet flow of the motive fluid through said passages, said valve including a stem and a flange, a duality of opposed areas interiorly of said stem, said valve being actuated due to compressed fluid from one end of the cylinder admitted on one of said areas while the other is subjected to a drop of the motive fluid pressure caused by the motive fluid exhausting from the other end of the cylinder, said valve while at either end of its travel allowing the flow of the motive fluid through said passages into one or the other of said cylinder, means for admitting motive fluid on the valve area last subjected to the compressed fluid from the cylinder for momentarily holding the valve at the ends of its travel, and surfaces within said valve block engageable with the peripheral wall of said valve stem and flange for momentarily cutting off the supply of the motive fluid to said cylinder during the reciprocation of said valve.

JOHN C. CURTIS.